United States Patent
Hwang et al.

(10) Patent No.: US 10,146,060 B2
(45) Date of Patent: Dec. 4, 2018

(54) DISPLAY APPARATUS, 3D FILM AND CONTROL METHOD THEREOF

(71) Applicant: SAMSUNG ELECTRONICS CO., LTD., Suwon-si (KR)

(72) Inventors: Seon-deok Hwang, Seoul (KR); Farid Mukhtarov, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 621 days.

(21) Appl. No.: 14/244,425

(22) Filed: Apr. 3, 2014

(65) Prior Publication Data

US 2015/0043198 A1 Feb. 12, 2015

(30) Foreign Application Priority Data

Aug. 9, 2013 (KR) .................. 10-2013-0094850

(51) Int. Cl.
| | |
|---|---|
| *G02B 27/22* | (2018.01) |
| *G02B 5/20* | (2006.01) |
| *H04N 13/312* | (2018.01) |
| *H04N 13/356* | (2018.01) |

(52) U.S. Cl.
CPC ......... *G02B 27/2221* (2013.01); *G02B 5/208* (2013.01); *H04N 13/312* (2018.05); *H04N 13/356* (2018.05); *H04N 2213/001* (2013.01); *Y10T 428/10* (2015.01)

(58) Field of Classification Search
CPC ..... G02B 27/2221; G02B 5/208; F21V 13/08; H04N 13/356; H04N 13/312; H04N 2213/0001
See application file for complete search history.

(56) References Cited

U.S. PATENT DOCUMENTS

| | | | |
|---|---|---|---|
| 7,210,836 | B2 | 5/2007 | Sasagawa et al. |
| 8,035,762 | B2 | 10/2011 | Ijzerman et al. |
| 8,314,897 | B2 | 11/2012 | Ijzerman et al. |

(Continued)

FOREIGN PATENT DOCUMENTS

| | | |
|---|---|---|
| CN | 1678943 A | 10/2005 |
| CN | 1890988 A | 1/2007 |

OTHER PUBLICATIONS

Communication dated Oct. 11, 2017, issued by The State Intellectual Property Office of P.R. China in counterpart Chinese application No. 201410391810.4.

(Continued)

*Primary Examiner* — Anthony J Frost
(74) *Attorney, Agent, or Firm* — Sughrue Mion, PLLC

(57) ABSTRACT

A display apparatus is provided. The display apparatus includes a display panel; a backlight configured to irradiate visible ray to the display panel in a 2D mode, and configured to irradiate ultraviolet ray to the display panel in a 3D mode; and a 3D film disposed between the display panel and backlight, wherein the 3D film comprises: a pattern formed by a plurality of lines distanced from one another by a predetermined distance; and a coating layer that is formed on one side of the plurality of lines pattern and transmits or reflects light patterned by the plurality of lines pattern, per line. Accordingly, it is possible to prevent deterioration of resolution of a screen image, provide a simple structure and enable a change to and from a 2D mode and a 3D mode.

13 Claims, 16 Drawing Sheets

(56) References Cited

U.S. PATENT DOCUMENTS

| | | | |
|---|---|---|---|
| 2005/0276071 A1 | 12/2005 | Sasagawa et al. | |
| 2007/0013624 A1* | 1/2007 | Bourhill | B82Y 20/00 345/84 |
| 2007/0216828 A1* | 9/2007 | Jacobs | G02B 6/0033 349/64 |
| 2008/0278640 A1 | 11/2008 | Ijzerman et al. | |
| 2009/0067156 A1* | 3/2009 | Bonnett | H04N 13/0454 362/97.2 |
| 2012/0008203 A1 | 1/2012 | Ijzerman et al. | |

OTHER PUBLICATIONS

Communication dated May 17, 2018 issued by the State Intellectual Property Office of P.R. China in counterpart Application No. 201410391810.4.

\* cited by examiner

230

620

610

DISPLAY APPARATUS, 3D FILM AND CONTROL METHOD THEREOF

CROSS-REFERENCE TO RELATED APPLICATIONS

This application claims priority from Korean Patent Application No. 10-2013-0094850, filed in the Korean Intellectual Property Office on Aug. 9, 2013, the disclosure of which is incorporated herein by reference, in its entirety.

BACKGROUND

1. Technical Field

Methods and apparatuses consistent with the exemplary embodiments relate to a display apparatus, 3D film, a control method thereof. More particularly, the exemplary embodiments relate to a display apparatus using a 3D film, a 3D film and a control method thereof.

2. Description of the Prior Art

Due to the recent development of electronic technologies, various kinds of electronic devices are being developed and provided. A case in point is display apparatuses such as TVs.

In particular, 3D display apparatuses from which users could view 3D images are recently being provided. There are two kinds of 3D display apparatuses. These two kinds of apparatuses glasses type and non-glasses type, depending on whether or not 3D image viewing glasses are used.

A shutter glasses type of display apparatus is an example of a glasses type system. Shutter glasses type relate to a method where a left eye image and a right eye image are output alternately, in an interlocked manner. When a user is wearing 3D glasses, left and right shutter glasses are alternately opened and closed so that the user can experience a three-dimensional sensation.

A non-glasses system is also called an autostereoscopic system. While displaying multiview images that have been shifted spatially, a non-glasses type of 3D display apparatus uses the Parallax Barrier method illustrated in FIG. 1a or the Lenticular Lens method illustrated in FIG. 1b, such that a light which corresponds to another multiview image is projected to the left eye and right eye of the user, thereby enabling the user to experience a three-dimensional effect.

The Parallax Barrier method illustrated in FIG. 1a has a structure where a portion where light penetrates and a portion where light is absorbed are repeatedly disposed, wherein an active parallax barrier is a liquid crystal panel provided such that the portion where light is absorbed may change into a portion that transmits light depending on whether or not a voltage is applied.

The Lenticular Lens method illustrated in FIG. 1b is a structure where multiview images are created according to refraction angles of the lenticular lens, wherein a birefringence lens called polarization activated microlens (PAM) is applied to change 2D to 3D. In this structure, whether or not a lens exists changes according to the direction of polarization. That is, when a lens exists, it is activated as a lenticular lens in order to embody 3D functions, and when the lens disappears, light is transmitted like in a general film and 2D functions are provided.

However, the active parallax barrier method requires a plurality of thin layers provided above an LCD panel for liquid crystal orientation and for applying voltage, and thus problems such as color variation, brightness deterioration, and deterioration of viewing angle characteristics etc. occur. Furthermore, since the parallax barrier has a portion that absorbs light, the brightness of the screen would also deteriorate.

In addition, in the active lenticular lens method, since the polarization activated microlens film and LC switch are disposed on an LCD panel, a deterioration of image quality occurs, and the structure becomes complicated because a PAM and LC switch have to be additionally deposited, resulting in an increase in manufacturing costs.

SUMMARY

A purpose of the exemplary embodiments is to provide a display apparatus that is operable in 2D mode and 3D mode using a 3D film that transmits visible rays and reflects infrared rays and a control method thereof.

In one aspect of the exemplary embodiment, a display apparatus is provided, which includes: a display panel; a backlight configured to irritate visible rays to the display panel in a 2D mode, and irradiates ultraviolet ray to the display panel in a 3D mode; and a 3D film disposed between the display panel and backlight, wherein the 3D film includes: a pattern formed by a plurality of lines distanced from one another by a predetermined distance; and a coating layer that is formed on one side of the pattern formed by the plurality of lines and transmits or reflects light patterned by the plurality of line patterns, per line.

The pattern formed by the plurality of lines may be a UV reflected coating pattern that transmits the visible ray and reflects the ultraviolet ray, and the coating layer may be a white phosphor coating layer that transmits the visible ray when it enters, and in response to the ultraviolet ray that passed a space between the pattern formed by the plurality of lines entering, white phosphor coating layer, converts the entering ultraviolet ray into visible rays and transmits the visible rays.

The plurality of line patterns may be a white phosphor coating pattern that transmits the visible ray, and in response to the ultraviolet ray entering, converts the ultraviolet ray into visible ray and transmits the converted visible ray, and the coating layer may be a UV reflected coating layer that transmits the visible ray when it enters, and in response to the ultraviolet ray that passed a space between the pattern formed by the plurality of lines entering plurality of line patterns, reflects the entering ultraviolet ray.

The backlight may comprise at least one first light source for providing the visible ray; and at least one second light source for providing the ultraviolet ray.

An aspect the display apparatus may further comprise a backlight driver configured to selectively turn on the at least one first light source or the at least one second light source; and a controller configured to turn on the at least one first light source when the 2D mode is initiated, and turn on the at least one second light source when the 3D mode is initiated.

In an aspect of the exemplary embodiments, the 3D film may further include a transparent layer that is located between the pattern formed by the plurality of lines and the coating layer.

Another aspect may provide a 3D film having a plurality of lines pattern distanced from one another by a predetermined distance; and a coating layer that is formed on one side of the plurality of line patterns and transmits or reflects light patterned by the pattern formed by the plurality of lines.

Herein, the pattern formed by the plurality of lines may be a UV reflected coating pattern that transmits the visible ray and reflects the ultraviolet ray, and the coating layer may be a white phosphor coating layer that transmits the visible ray when it enters, and in response to the ultraviolet ray that passed a space between the pattern formed by the plurality of lines pattern entering white phosphor coating layer, converts the ultraviolet ray into visible ray and transmits the visible ray.

In addition, the pattern formed by the plurality of lines may be a white phosphor coating pattern that transmits the visible ray, and in response to the ultraviolet ray entering, the white phosphor coating pattern converts the ultraviolet ray into a visible ray and transmits the visible ray, and the coating layer may be a UV reflected coating layer that transmits the visible ray when it enters, and in response to the ultraviolet ray that passed a space between the pattern formed by the plurality of lines entering, reflects the entering ultraviolet ray.

In an aspect of the 3D film, the 3D film may further include a transparent layer that is located between the pattern formed by the plurality of lines and the coating layer.

In another aspect of the exemplary embodiments, a method of controlling a backlight is provided. The method includes a backlight of a display apparatus having a display panel, backlight, and 3D film disposed between the display panel and backlight, the method including: controlling the backlight to provide a visible rays in the 3D film direction when a 2D mode is initiated; and controlling the backlight to provide an ultraviolet ray in the 3D film direction in response to a 3D mode being initiated so as to provide to the display panel the visible ray patterned in a plurality of lines which are distanced from one another, to the display panel.

In the another aspect of the backlight controlling method, the 3D film may comprise a plurality of lines pattern distanced from one another by a predetermined distance; and a coating layer that is formed on one side of the plurality of lines pattern and transmits or reflects light patterned by the pattern formed by the plurality of lines.

In another aspect of the backlight controlling method, the pattern formed by the plurality of lines may be a UV reflected coating pattern that transmits the visible ray and reflects the ultraviolet ray, and the coating layer may be a white phosphor coating layer that transmits the visible ray when it enters, and in response to the ultraviolet ray that passed a space between the pattern formed by the plurality of lines entering, the white phosphor coating layer converts the ultraviolet ray into visible ray and transmits the visible ray.

In another aspect of the backlight controlling method, the pattern formed by the plurality of lines may be a white phosphor coating pattern that transmits the visible ray, and in response to the ultraviolet ray entering, converts the ultraviolet ray into visible ray and transmits the visible ray, and the coating layer may be a UV reflected coating layer that transmits the visible ray when it enters, and in response to the ultraviolet ray that passed a space between the pattern formed by the plurality of lines entering, reflects the entering ultraviolet ray.

An aspect of an exemplary embodiment provides a display apparatus including: a 3D film disposed between a display panel and a backlight, wherein the 3D film comprises: a pattern formed by a plurality of lines distanced from one another by a predetermined distance; and a coating layer that is formed on one side of the pattern formed by a plurality of lines and transmits or reflects light patterned by the lines of the pattern formed by the plurality of lines, per line.

The display apparatus may further include a display panel; and a backlight configured to irradiate a visible ray to the display panel in a 2D mode, and irradiate an ultraviolet ray to the display panel in a 3D mode.

The pattern formed by the plurality of lines may be a UV reflected coating pattern that transmits the visible ray and reflects the ultraviolet ray, and the coating layer may be a white phosphor coating layer that transmits the visible ray in response to the visible ray entering the coating layer, and converts the entering ultraviolet ray into visible ray and transmits the visible ray in response to the ultraviolet ray that passed a space between the pattern formed by the plurality of lines entering the coating layer.

The 3D film may further include a transparent layer that is located between the pattern formed by the plurality of lines and the coating layer.

In addition, the backlight may include at least one first light source configured to provide the visible ray; and at least one second light source configured to provide the ultraviolet ray.

As aforementioned, according to the various exemplary embodiments, it is possible to prevent deterioration of screen resolution, provide a simple structure, and enable changing to and from a 2D mode and 3D mode.

BRIEF DESCRIPTION OF THE DRAWINGS

The above and/or other aspects of the exemplary embodiments will be more apparent by describing certain aspects of the present disclosure with reference to the accompanying drawings, in which.

DETAILED DESCRIPTION

Figure 1A:
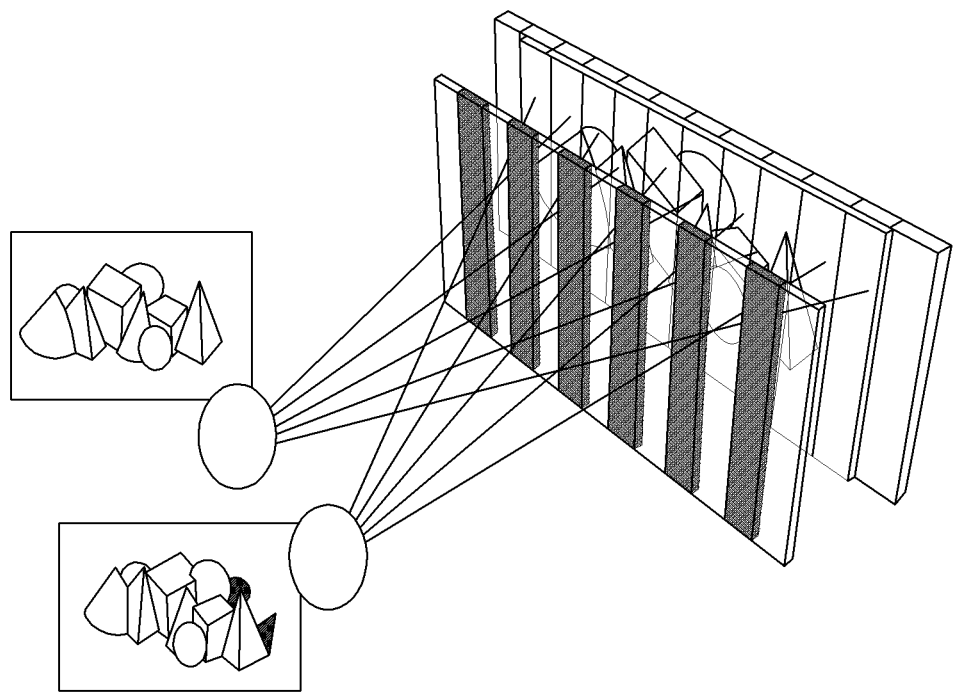
FIG. 1a and FIG. 1b are views for explaining problems of the related art.
Figure 1B:
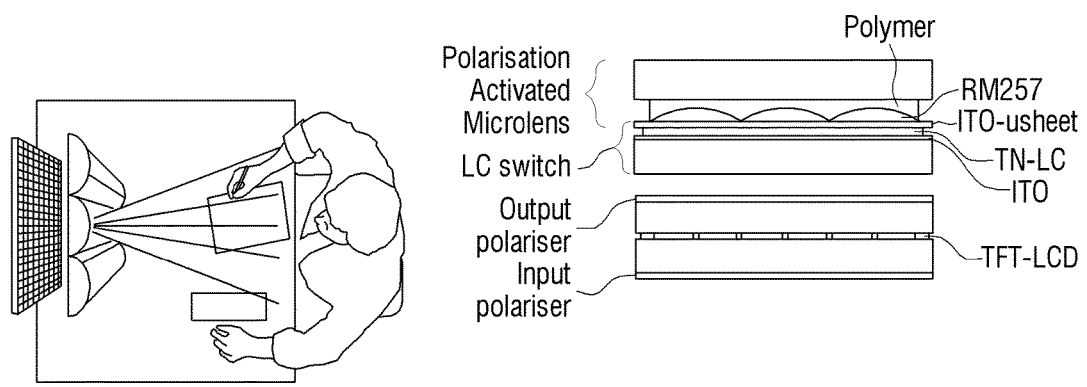

Certain exemplary embodiments are described in greater detail below, with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without those specifically defined matters. Also, well-known functions or constructions are not described in detail since they would obscure the application with unnecessary detail.

Figure 2:
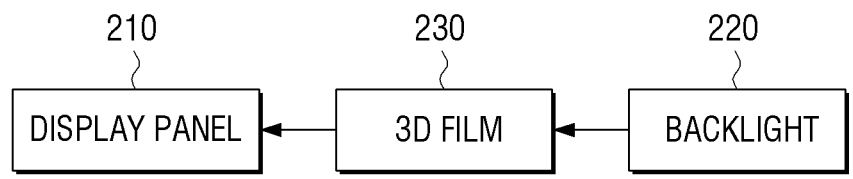
FIG. 2 is a block diagram which illustrates a configuration of a display apparatus, according to an exemplary embodiment.

FIG. 2 is a block diagram which illustrates a configuration of a display apparatus, according to an exemplary embodiment.

According to FIG. 2, the display apparatus 200 comprises a display panel 210, backlight 220 and a 3D film 230. Herein, the display apparatus 200 may display a 2D image or a 3D image. A display apparatus for displaying a 3D image is an apparatus configured to display contents in a 3D method so that a user can experience a three-dimensional effect. Various types of apparatuses such as a TV, monitor, PC mobile phone, laptop computer, tablet PC, digital frame, e-book, and PDA etc. may be embodied as 3D display apparatuses.

Such a 3D display apparatus uses a stereoscopic display method or an autostereoscopic display method. The stereoscopic display method refers to a three-dimensional display method using glasses, whereas the autostereoscopic display method refers to a three-dimensional display method that does not use glasses.

In particular, autostereoscopic display methods include a method for embodying a 3D image using a parallax barrier, a method for embodying a 3D image by a holography display that shows three-dimensional images according to the lights to be reproduced, and a method for embodying a 3D image by displaying a voxel inside the actual space through a physical structure such as rotation, and a method for embodying a 3D image using the plasmarisation effect of air at the focus where laser rays are accumulated.

Herein, the 3D film 230 according to an exemplary embodiment may be applied to a method for embodying a 3D image using a parallax barrier.

The display panel 210 performs a function of displaying an image. More specifically, the display panel 210 may be embodied as various color liquid crystals, and may adjust the penetration rate of the backlight generated in the backlight 220 in order to visualize an image signal, thereby displaying an input image on a screen.

For example, the display panel 210 may be embodied as an LCD panel, wherein two substrates having electrodes are disposed to face each other, and a liquid crystal material is injected between the two substrates. Herein, in response to a voltage being applied to these two electrodes, an electric field is formed which moves the molecules of the liquid crystal material injected between the two substrates, to thereby adjust the penetration rate of the backlight of the LCD panel, and accordingly, it becomes possible to display letters or images.

In a 2D mode, the backlight 220 may irradiate visible ray to the display panel 210, and in a 3D mode, may irradiate ultraviolet ray to the display panel 210. Herein, the visible ray may include at least one first light source for providing a visible ray, and at least one second light source for providing an ultraviolet ray.

More specifically, the backlight 220 may include a white light emitting diode (LED) or R/G/B LED for providing visible ray, and an ultraviolet LED for providing ultraviolet ray. In addition, the backlight 220 may disperse the light from these LED to the display panel 210 and evenly transmit the light on the panel surface of the display panel 210.

It is possible to use an ultraviolet LED to provide the ultraviolet ray, but for safety purposes, a near ultraviolet ray LED of which the wavelength is near 400-430 nm may be used to provide a near ultraviolet ray.

In addition, an ultraviolet ray LED may be additionally arranged between white light emitting diodes (LEDs) or R/G/B LEDs.

An LED is an element for generating light using the phenomenon of radiation (electrophoto luminescence) that occurs when applying voltage to a semiconductor. Suitable materials for an LED are those which satisfy conditions that luminescence wavelength exists in a visible or near-infrared area, have high luminescence efficiency, and P—N bonding is possible, etc.

Compound semiconductors such as gallium nitride (GaN), gallium arsenide (GaAs), gallium phosphorous (GaP), gallium-arsenic-phosphorous (GaAs1-xPx), gallium-aluminum-phosphorous (Ga1-xA1xAs), indium phosphide (InP), and indium-gallium-phosphorous (In1-xGaxP) etc. may be used as an LED.

In addition, the backlight 220 may comprise a light guide plate (not illustrated). The light guide plate (not illustrated) plays a role of dispersing the light from the LED to the display panel 210. More specifically, by multi-reflecting the light entered from the LED, the light guide plate (not illustrated) plays a role of dispersing the light on the entirety of its upper surface and transmitting the light evenly on the panel of display panel 210.

In addition, the backlight 220 may comprise several types of functional films. Herein, the film plays a role of diffusing the light from the light guide plate (not illustrated), and scattering the light to increase the uniformity of brightness of the backlight. At least one of various optical films such as a diffusing sheet, a prism sheet, and a DBEF (Dual Brightness Enhancement Film) etc., may be used as functional film.

In addition to the above, top chassis, middle mold, LED PCB, and bottom chassis etc., may be further included, but these are not related to the technical features of the exemplary embodiment, but are obvious configurations for those skilled in the art, and thus detailed explanation thereof is omitted.

Meanwhile, there are direct type and edge type backlights 220. And accordingly, the arrangement structure of the white light emitting diode (LED) or R/G/B LED or ultraviolet LED may differ. This will be explained hereinbelow in more detail.

Accordingly, in a 2D mode, the backlight 220 may use a white light emitting diode or R/G/B LED to irradiate visible ray, and in a 3D mode, the backlight 220 may use the ultraviolet LED to irradiate ultraviolet ray to the display panel 210. Therefore, the backlight 220 may selectively irradiate visible rays or ultraviolet rays, per different modes.

The 3D film 230 may be arranged between the display panel 210 and backlight 220.

Figure 3:
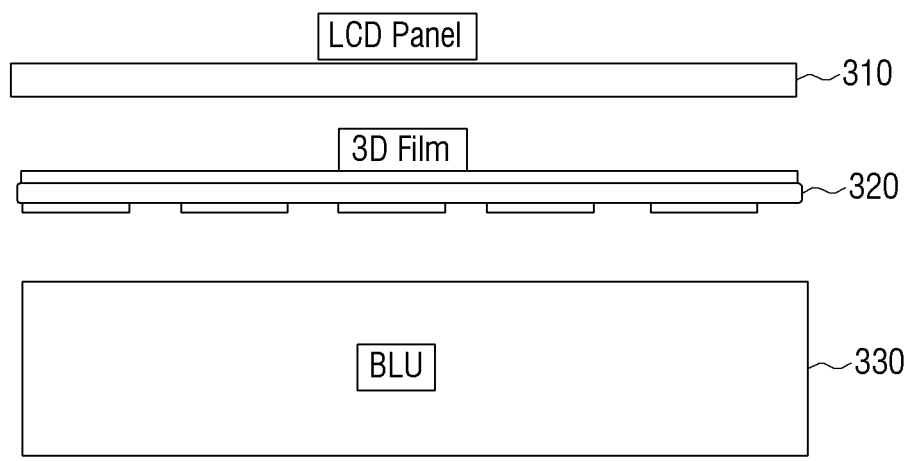
FIG. 3 is a view which illustrates a structure where a display panel, 3D film, and backlight are deposited, according to an exemplary embodiment.

FIG. 3 is a view which illustrates a structure where a display panel, 3D film, and backlight are deposited according to an exemplary embodiment.

According to FIG. 3, the display panel 310, 3D film 320, and backlight 330 are deposited in the aforementioned order, and the 3D film 320 is arranged between the display panel 310 and backlight 330.

Figure 4A:
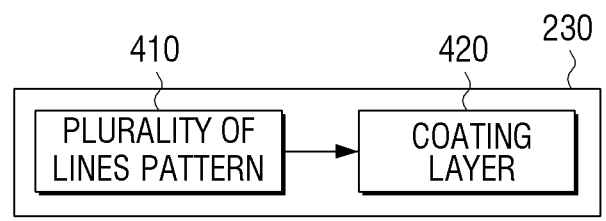
FIG. 4a and FIG. 4b are block diagrams which illustrate a configuration of a 3D film, according to an exemplary embodiment.
Figure 4B:
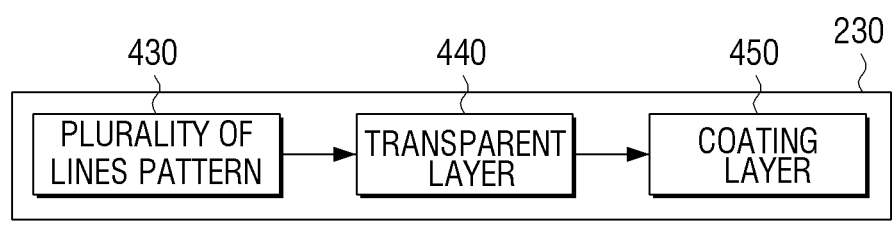

FIGS. 4a and 4b are block diagrams which illustrate a configuration of a 3D film according to an exemplary embodiment.

With reference to FIG. 4a, the 3D film 230 may comprise a pattern formed by a plurality of lines 410 and coating layers 420.

A pattern formed by a plurality of lines 410 may be distanced from one another by a predetermined distance. Herein, the pattern of the pattern formed by a plurality of lines 410 may have a general periodic stripe line or an inclined angle, compared to the display panel 210. In addition, the shape and angle of the pattern may be changed according to the conditions for improving the 3D features.

Herein, the moiré phenomenon may be an example of 3D features. A moiré phenomenon pattern refers to a thick line pattern that occurs due to the difference between spatial frequencies when two regular intensity distributions are overlapped. There is a moiré of sum that occurs due to the sum of the intensity distribution, and a moiré of multiplication that occurs due to multiplication, wherein the former may be implemented as a photograph where two regular distributions have been dually exposed, and the latter may be realized by piling up the transparency where each regular distribution has been recorded.

Therefore, the pattern shape may be changed in order to reduce such a moiré phenomenon.

Meanwhile, the coating layer 420 may be formed on one side of the pattern formed by the plurality of lines and may transmit or reflect the light patterned by the pattern formed by the plurality of lines 410.

Meanwhile, as illustrated in FIG. 4b, the 3D film 230 may further comprise a transparent layer 440 that is located between the pattern formed by the plurality of lines 430 and coating layer 450.

Herein, the transparent layer 440 may be for example, glass. Therefore, on the first surface of the transparent layer 440, a pattern formed by a plurality of lines 430 are disposed and distanced from one another at a predetermined distance, and on the second surface, a coating layer 450 may be formed that may transmit or reflect the light patterned by the pattern formed by the plurality of lines 430, per line.

Hereinbelow is detailed explanation on the structure of the 3D film 230 with reference to FIGS. 5 to 8.

Figure 5:
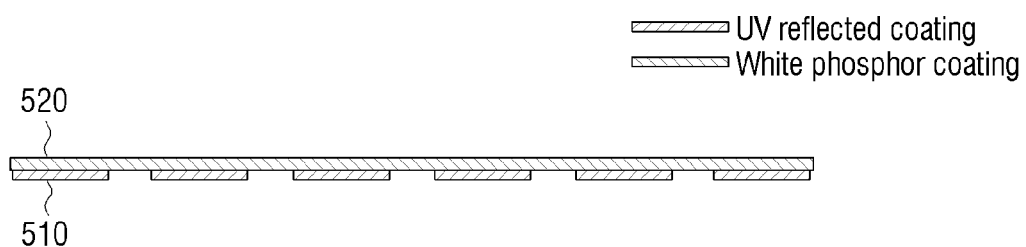
FIG. 5 is a view which illustrates a structure of a 3D film, according to an exemplary embodiment.

FIG. 5 is a view which illustrates the structure of a 3D film, according to an exemplary embodiment.

With reference to FIG. 5, of the pattern formed by a plurality of lines, distanced from one another by a certain distance on the 3D film 230, is a UV reflected coating pattern that transmits visible ray and reflects ultraviolet ray.

That is, the UV reflected coating pattern may perform the function of isolating ultraviolet ray that is irradiated from the backlight 220. Accordingly, the ultraviolet ray that is irradiated to the portion which corresponds to the plurality of line patterns 510 may be transmitted without being reflected.

In addition, since only the ultraviolet ray that is irradiated to the portion which corresponds to the space between the plurality of lines pattern 510 may be transmitted and not reflected, such ultraviolet ray may be patterned light that has the shape of a pattern formed by a plurality of lines 510.

The coating layer 520 that is formed on one side of the pattern formed by the plurality of lines 510 of the 3D film 230 is a white phosphor coating layer that transmits or reflects the light patterned by the plurality of lines pattern 510, per line, and that converts the ultraviolet ray that passed the space between the plurality of lines pattern 510 into a visible ray and transmits the same.

That is, the coating layer 520 transmits visible ray straight through, but when the ultraviolet ray that is irradiated to the portion which corresponds to the space between the plurality of lines pattern 510, is not reflected but rather is transmitted and then patterned ultraviolet ray enters the coating layer 520, the coating layer 520 may convert the ultraviolet ray into a visible ray and transmit the visible ray. In addition, the visible ray may maintain the pattern shape.

The aforementioned ultraviolet reflected coating pattern may be manufactured such that it isolates ultraviolet ray and transmits visible ray, and the phosphor of the white phosphor coating layer only reacts to the ultraviolet ray and may thus only transmit the visible ray.

Accordingly, since in 2D mode, the backlight 220 irradiates visible ray in 2D mode, the plurality of lines pattern 510 and coating layer 520 may transmit 520 visible ray straight through and the display apparatus 200 may display 2D images.

In addition, since in 3D mode the backlight 220 irradiates ultraviolet ray, the ultraviolet ray may be ultraviolet ray patterned by the pattern formed by the plurality of lines 510, and the patterned ultraviolet ray may be converted into a white visible ray by the coating layer 520 in order to maintain the pattern shape, and thus when a 3D image is displayed on the display panel 210, by such a pattern, the user will become able to view the 3D image without glasses.

Figure 6:
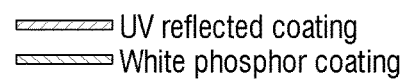
FIG. 6 is a view which illustrates a structure of a 3D film, according to another exemplary embodiment.
Figure 6:
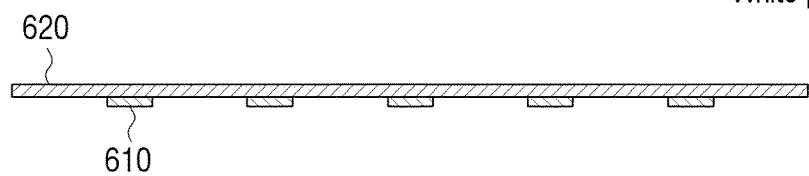

FIG. 6 is a view which illustrates a structure of a 3D film, according to another exemplary embodiment.

With reference to FIG. 6, the pattern formed by the plurality of lines 610 of the 3D film 230 that are distanced from one another at a predetermined distance is a white phosphor coating pattern that transmits visible ray and that, in response to ultraviolet ray entering, converts the ultraviolet ray into a visible ray and transmits the visible ray.

That is, from among the ultraviolet ray irradiated from the backlight 220, the ultraviolet ray irradiated from the pattern formed by a plurality of lines 610 is converted into a visible ray and is transmitted, and the ultraviolet ray irradiated to the portion which corresponds to the space between the plurality of lines pattern 610 is not converted into visible ray but rather is transmitted straight through.

In addition, since only the ultraviolet ray irradiated to the portion which corresponds to the space between the plurality of lines pattern 610 can be converted into visible ray and be transmitted, such an ultraviolet ray may be a patterned light having the shape of the pattern formed by a plurality of lines pattern 610.

The coating layer 620 that is formed on one side of the plurality of lines pattern 610 of the 3D film 230 and transmits or reflects the light patterned by the pattern formed by the plurality of lines 610 is a UV reflected coating layer that transmits a visible ray when a visible ray enters, and reflects an ultraviolet ray in response to a ultraviolet ray that passed the space between the plurality of lines pattern 610, entering the coating layer 620.

That is, in response to visible ray being irradiated to a plurality of lines pattern 610, patterned and then converted, and ultraviolet ray irradiated to the portion which corresponds to the space between the plurality of lines pattern 610, not converted to visible ray but transmitted straight through, enters the coating layer 620, the UV reflected coating layer may transmit the visible ray irradiated to the plurality of lines pattern 610, patterned and converted straight through, but may reflect the ultraviolet ray that is irradiated to the portion which corresponds to the space between the plurality of lines pattern 610 and is not converted into visible ray but rather is transmitted straight through.

Accordingly, the ultraviolet reflected coating layer only transmits the visible ray which is irradiated to the plurality of lines pattern 610 and patterned and converted, and thus the transmitted visible ray may maintain its pattern shape.

The aforementioned UV reflected coating pattern may be made to isolate ultraviolet ray and transmit visible ray, and the phosphor of the white phosphor coating layer may transmit the visible ray straight through since it only reacts to ultraviolet ray.

Accordingly, in 2D mode, the backlight 220 irradiates visible ray, and thus the pattern formed by the plurality of lines 610 and coating layer 620 may transmit the visible ray straight through, and the display apparatus 200 may display 2D images.

In addition, in 3D mode, the backlight 220 irradiates ultraviolet ray, and thus the visible ray that is irradiated to a plurality of lines pattern 610 and converted, transmits straight through the coating layer 620, and the ultraviolet ray that is irradiated to the portion which corresponds to the space between the plurality of lines pattern 620 and is not converted into visible ray not is transmitted straight through, but rather is reflected by the coating layer 620. Thus, the visible ray that transmitted the coating layer 620 may be patterned visible ray, and in response to 3D images being displayed on the display panel 210 by such a pattern, the user may view the 3D images without glasses.

Figure 7:
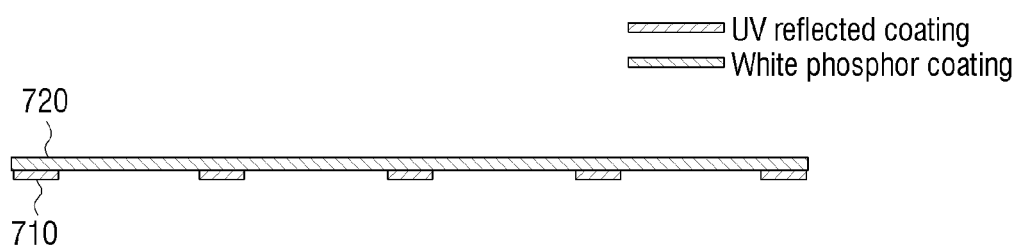
FIG. 7 is a view which illustrates a structure of a 3D film, according to another exemplary embodiment.

FIG. 7 is a view which illustrates a structure of a 3D film, according to another exemplary embodiment.

With reference to FIG. 7, the pattern formed by the plurality of lines 710 of the 3D film 230, distanced by a predetermined distance is a UV reflected coating pattern that transmits the visible ray and reflects the ultraviolet ray.

Moreover, the coating layer 720 formed on one side of the pattern formed by the plurality of lines 710 of the 3D film 230 and that transmits or reflects the light patterned by the plurality of lines pattern 710, per line, is a white phosphor coating layer that transmits the visible ray when the visible ray enters, and that converts the ultraviolet ray into a visible ray and transmits the visible ray in response to the ultraviolet ray that passed the space between the pattern formed by the plurality of lines 710 entering.

With reference to FIG. 7, compared to the aforementioned FIG. 5, it can be seen that the distance between the plurality of lines pattern 710 has changed.

That is, compared to FIG. 5, the distance between the lines of the pattern formed by the plurality of lines 710 became wider. Thus, compared to the ultraviolet ray irradiated and reflected to the portion which corresponds to the plurality of lines pattern 710, the amount of ultraviolet ray that is irradiated to the portion which corresponds to the space between the plurality of lines pattern 710 and not reflected, but rather transmitted is much larger.

In addition, since only the ultraviolet ray that is irradiated to the portion which corresponds to the space between the lines of the plurality of lines pattern 710 can be transmitted and not reflected, such a ultraviolet ray may be patterned light having the shape of the pattern formed by the plurality of lines 710.

Accordingly, the patterned light having the shape of a plurality of lines pattern 510 and the patterned light having the shape of a plurality of lines pattern 710 have different pattern shapes from each other.

Figure 8:
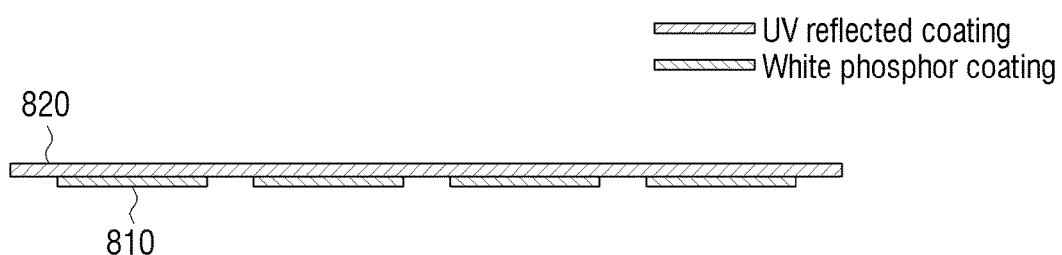
FIG. 8 is a view which illustrates a structure of a 3D film according to another exemplary embodiment.

FIG. 8 is a view which illustrates the structure of a 3D film, according to another exemplary embodiment.

With reference to FIG. 8, the pattern formed by the plurality of lines 810, that are distanced by a predetermined distance from one another is a white phosphor coating pattern that transmits visible ray and that converts ultraviolet ray into visible ray and then reflects the converted ultraviolet ray when an ultraviolet ray enters.

In addition, the coating layer 820 that is formed on one side of the pattern formed by the plurality of lines 810 of the 3D film 230 and that transmits or reflects the patterned light, per line, is a UV reflected coating layer that transmits visible ray when visible ray enters, and reflects ultraviolet ray the ultraviolet ray that passed the space between the plurality of lines pattern 820 enters the coating layer.

With reference to FIG. 8, compared to the aforementioned FIG. 6, it can be seen that the distance between the lines of the plurality of lines pattern 810 has changed.

That is, compared to FIG. 6, the distance between the lines of the pattern formed by the plurality of lines 810 became narrower, and thus the amount of ultraviolet ray from among the ultraviolet ray irradiated from the backlight 220 that is irradiated to the plurality of line patterns 810 and is converted into visible ray and is transmitted, becomes larger than the amount of ultraviolet ray that is transmitted straight through and not converted into visible ray.

In addition, since only the ultraviolet ray that is irradiated to the portion which corresponds to the space between the lines of the plurality of lines pattern 810 may be converted into visible ray and penetrate the coating layer 820, such visible ray may be a patterned visible ray having the shape of the pattern formed by the a plurality of lines 810.

Accordingly, the patterned light having the shape of the pattern formed by a plurality of lines 610 in FIG. 6 and the patterned light having the shape of the pattern formed by a plurality of lines 810 in FIG. 8 have different pattern shapes.

FIGS. 5 to 8 illustrate a 3D film that does not include a transparent layer, but as aforementioned, the 3D film may further include a transparent layer, and the 3D film where a transparent layer is included may be applied to the exemplary embodiment of FIGS. 5 to 8.

Hereinbelow is detailed explanation on the structure of the backlight 220 with reference to FIGS. 9 and 10.

In general, there are direct type and edge type backlights 220. The direct type backlight uses a method where a light source is evenly distributed on the back surface of the LCD panel, and a diffusion panel is disposed on the front surface of the light source, and a reflection panel is disposed on the rear surface of the light source, so as to reflect and diffuse the light released from the light source. However, in the case of a direct type backlight, there is a limitation with respect to making a thin backlight in that a predetermined distance must be maintained between the light source and the diffusion panel in order to obtain the desired brightness and uniformity.

Figure 9:
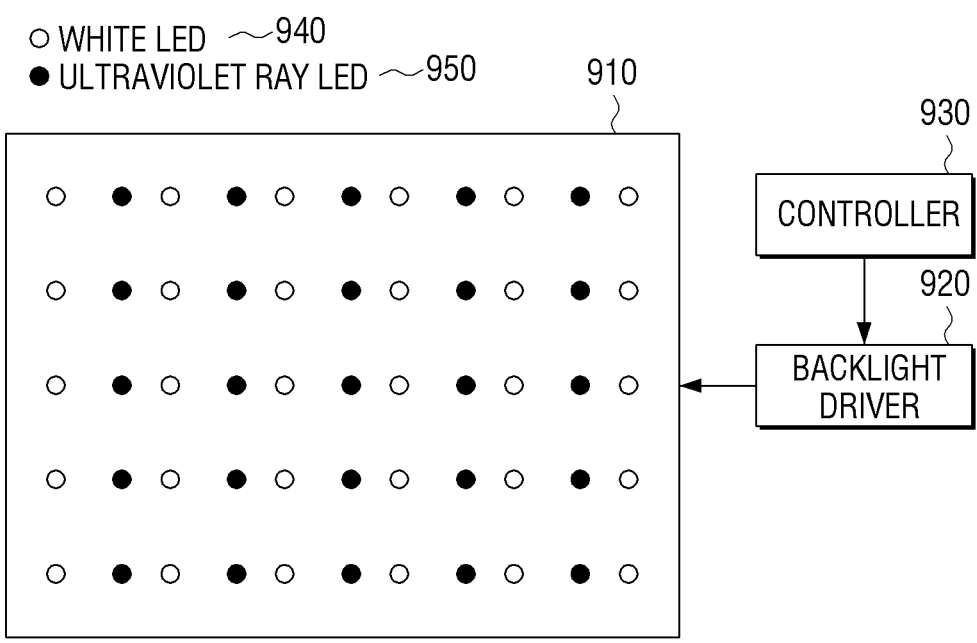
FIG. 9 is a view which illustrates a perpendicular type backlight, according to an exemplary embodiment.

FIG. 9 is a view which illustrates a direct type backlight, according to an exemplary embodiment.

The display apparatus 200 may further comprise a backlight driver 920 and a controller 930.

In FIG. 9, a direct type backlight 910 is illustrated, and the backlight 910 comprises at least one first light source for providing a visible ray and at least one second light source for providing an ultraviolet ray. For example, the first light source may be a white LED 940 and the second light source may be an ultraviolet LED 950.

Herein, the ultraviolet ray LED 950 is disposed in the intervals of the white LEDs 940. Therefore, since the structure of using the existing white LED 940 is used, the light output features (angle, uniformity etc.) of the light output from the backlight 220 are all stable.

In addition, the backlight driver 920 may selectively turn on at least one first light source or at least one second light source. More specifically, the backlight driver 920 may turn on the white LED 940 for providing visible ray in the 2D mode, and turn on the ultraviolet ray LED 950 for providing ultraviolet ray in the 3D mode.

Furthermore, the controller 930 may control the backlight driver 920 to turn on the at least one light source when the 2D mode is initiated, and to turn on the at least one second light source when the 3D mode is initiated.

More specifically, the controller 930 may control the backlight driver 920 to turn on the white LED 940 to provide a visible ray when the 2D mode is initiated, and to turn on the ultraviolet ray LED 950 to provide an ultraviolet ray when the 3D mode is initiated.

Figure 10:
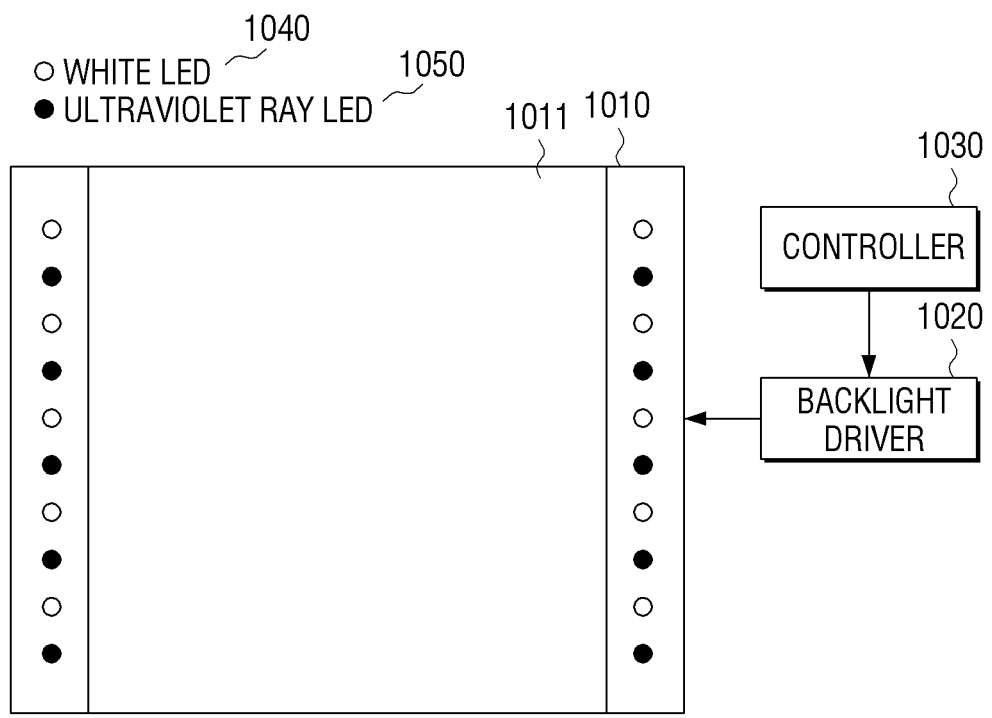
FIG. 10 is a view which illustrates an edge type backlight, according to an exemplary embodiment.

FIG. 10 is a view which illustrates an edge type backlight, according to an exemplary embodiment.

The display apparatus 200 may further comprise a backlight driver 1020 and a controller 1030.

In FIG. 10, an edge type backlight 1010 is illustrated, and the backlight 1010 comprises at least one first light source for providing a visible ray and at least one second light source for providing an ultraviolet ray. For example, the first light source may be a white LED 940 and the second light source may be an ultraviolet LED 950.

Herein, the ultraviolet LED 1050 is disposed in the intervals of the white LED 1040 disposed at the edge of the backlight 1010. That is, the backlight 1010 has a white LED 1050 and ultraviolet LED 1050 at one side and another side edge of the light guide plate 1011, and the light output from the white LED 1040 and ultraviolet LED 1050 enters the side of the light guide plate 1011. Herein, the light that entered the light guide plate may be distributed to the front surface by a total reflection inside the light guide plate, and may embody a surface light source through light mixing and re-reflection etc. by optical film and provide the backlight to the display panel 210. As such, in an edge type backlight, light source is attached to a side of the light guide plate, and thus the backlight may be made very thin and the brightness and uniformity may be increased depending on the design of the light reflection surface.

The white LED 1040 and ultraviolet LED 1050 may each be disposed on the upper edge and lower edge of the light guide plate 1011, or one the left edge and right edge of the light guide plate 1011. FIG. 10 is a view of an exemplary embodiment where a white LD 1040 and ultraviolet LED 1050 are disposed on a left edge and right edge of the light guide plate 1011.

As aforementioned, since the structure using existing white LEDs 1040 is utilized, the output features (angle and uniformity etc.) of the light output from the backlight 220 are stable.

In addition, the backlight driver 1020 may selectively turn on at least one first light source or at least one second light source. More specifically, in 2D mode, the backlight driver 1020 may turn on the white LED 1040 in order to provide visible ray and in 3D mode, the backlight driver 1020 may turn on the ultraviolet LED 1050 in order to provide ultraviolet ray.

In addition, the controller 1030 may control the backlight driver 1020 to turn on at least one first light source when the 2D mode is initiated, and to turn on at least one second light source when 3D mode is initiated.

More specifically, when the 2D mode is initiated, the controller 1030 may control the backlight driver 1020 to turn on the white LED 1040 to provide a visible ray, and to turn on the ultraviolet LED 1050 to provide an ultraviolet ray when the 3D mode is initiated.

Meanwhile, when initiating the 3D mode, the controller 1030 may combine the plurality of sub pixels that configure the pixels of the left eye image and the plurality of sub pixels that configure the pixels of the right eye image to form one frame.

Accordingly, the display apparatus 200 may refract the plurality of images photographed at different points in different angles, and may provide the focused image to a location distanced by a predetermined distance that is the so-called viewing distance. The location where such an image is formed is called a viewing area. Accordingly, the user will experience the three-dimensional effect that occurs when one of the user's eyes is located in a first viewing area, and the other eye is located in the second viewing area.

Figure 11:
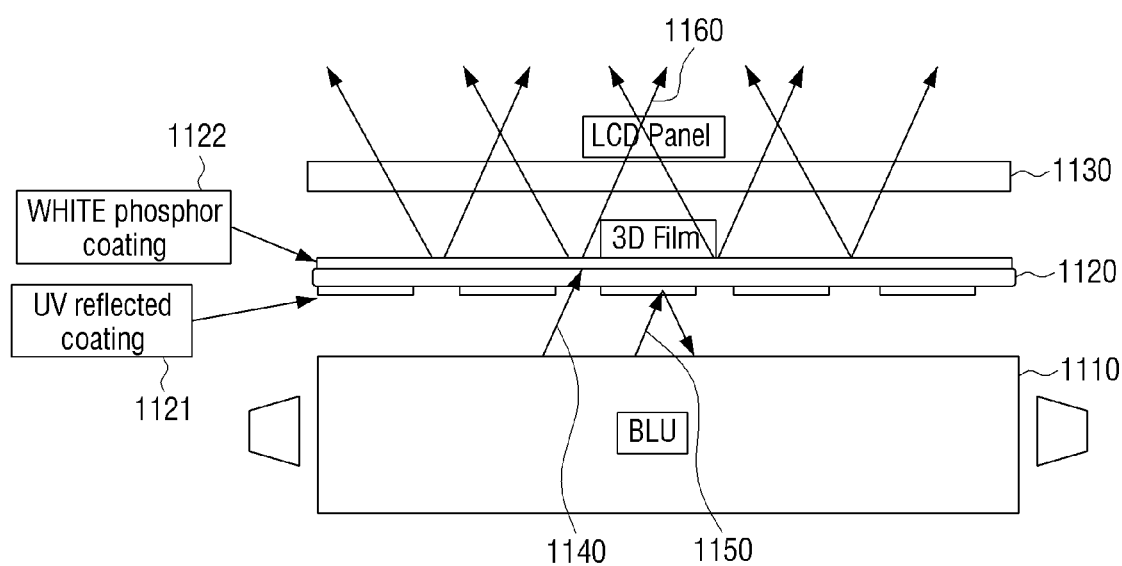
FIG. 11 is a view which illustrates how a 3D mode is embodied, according to an exemplary embodiment.

FIG. 11 is a view which illustrates how a 3D mode is provided, according to an exemplary embodiment.

With reference to FIG. 11, the 3D film 1120 has a ultraviolet reflection coating pattern 1121 on its lower surface, that is distanced by a predetermined distance and that transmits a visible ray but reflects an ultraviolet ray, and has on its upper surface a white phosphor coating layer 1122 that transmits the visible ray when the visible ray enters and converts the ultraviolet ray into visible ray and transmits the visible ray in response to the ultraviolet ray that passed the space between the ultraviolet ray reflection coating pattern 1121 entering the white phosphor coating layer.

Therefore, in 3D mode, when the backlight 1110 outputs ultraviolet ray 1150, from among the ultraviolet ray output, the ultraviolet ray that is irradiated to the ultraviolet reflection coating pattern 1121 portion is reflected and thus cannot be transmitted, whereas the ultraviolet ray 1140 that passed the space between the ultraviolet reflection coating pattern 1121 may be converted into visible ray 1160 by the white phosphor coating layer 1122 and be transmitted.

Accordingly, the visible ray 1160, converted by the white phosphor coating layer 1122 from the ultraviolet ray 1140 that passed the space between the ultraviolet reflection coating pattern 1121, is a light patterned by the pattern shape of the ultraviolet reflection coating pattern 1121, and thus the user becomes able to view 3D images.

Figure 12:
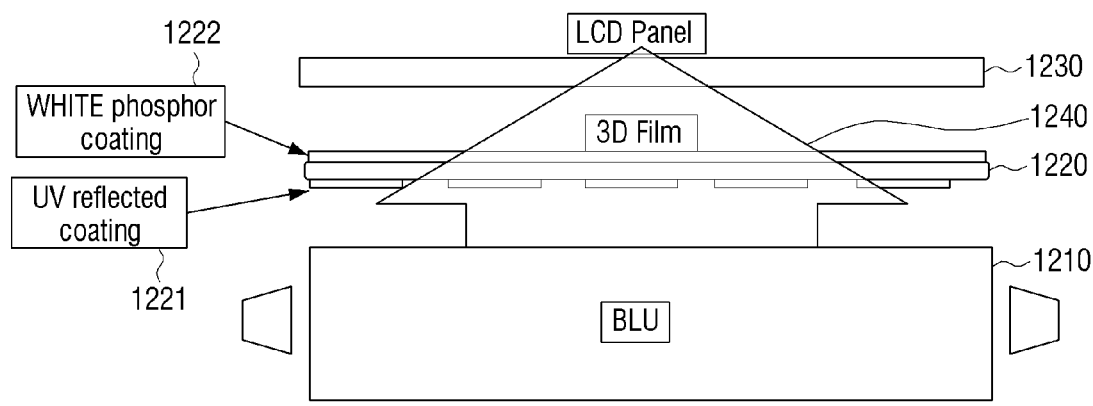
FIG. 12 is a view which illustrates how a 2D mode is embodied, according to an exemplary embodiment.

FIG. 12 is a view which illustrates how a 2D mode is provided, according to an exemplary embodiment.

With reference to FIG. 12, the 3D film 1220 the 3D film 1120 has on its lower surface an ultraviolet reflection coating pattern 1221 that is distanced by a predetermined distance and transmits a visible ray but reflects an ultraviolet ray, and has on its upper surface a white phosphor coating layer 1122 that transmits visible ray when visible ray enters and when ultraviolet ray that passed the space between the ultraviolet ray reflection coating pattern 1221 enters, converts the ultraviolet ray into a visible ray and transmits the visible ray.

Therefore, in 2D mode, when the backlight 1210 outputs visible ray 1240, the output visible ray 1240 may be transmitted straight through regardless of the ultraviolet reflection coating pattern 1221 and white phosphor coating layer 1222, Accordingly, the transmitted visible ray 1240 may be transmitted without being patterned according to the pattern shape of the ultraviolet reflection coating pattern 1221.

Therefore, the user may view 2D images without distortion.

Figure 13:
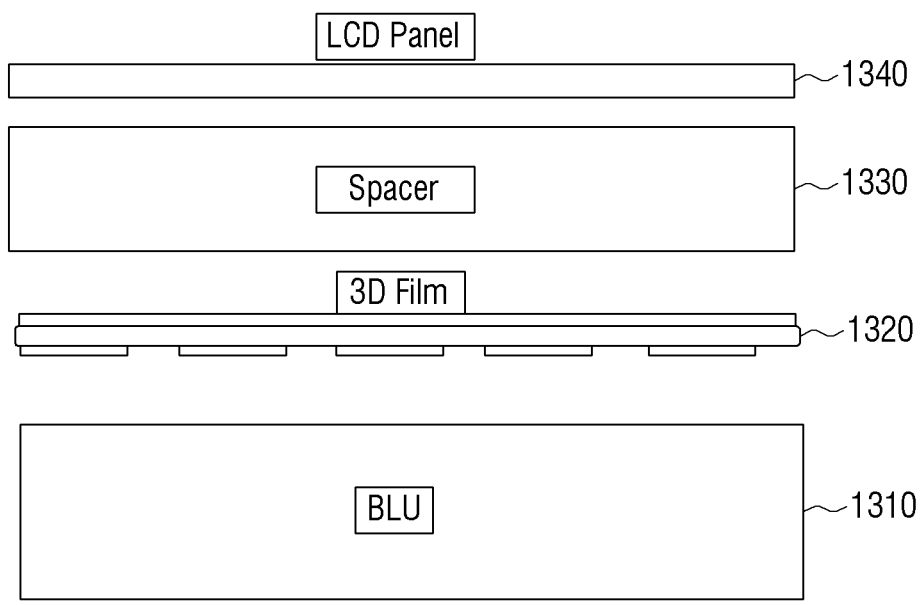
FIG. 13 is a block diagram which illustrates a display apparatus where a spacer is inserted, according to an exemplary embodiment.

FIG. 13 is a block diagram which illustrates a configuration of a display apparatus where a spacer is inserted, according to an exemplary embodiment.

The display apparatus 200 may comprise a backlight 1310, 3D film 1320, spacer 1330, and display panel 1340.

With reference to FIG. 13, it can be seen that the spacer 1330 is inserted between the 3D film 1320 and the display panel 1340.

This is because it is necessary to maintain a predetermined distance between the display panel 1340 and 3D film 1320 when designing for a 3D embodiment.

The spacer 1330 may be filled with air to maintain a distance with empty space, or glass having a good transmission rate may be used to maintain a predetermined distance.

Figure 14:
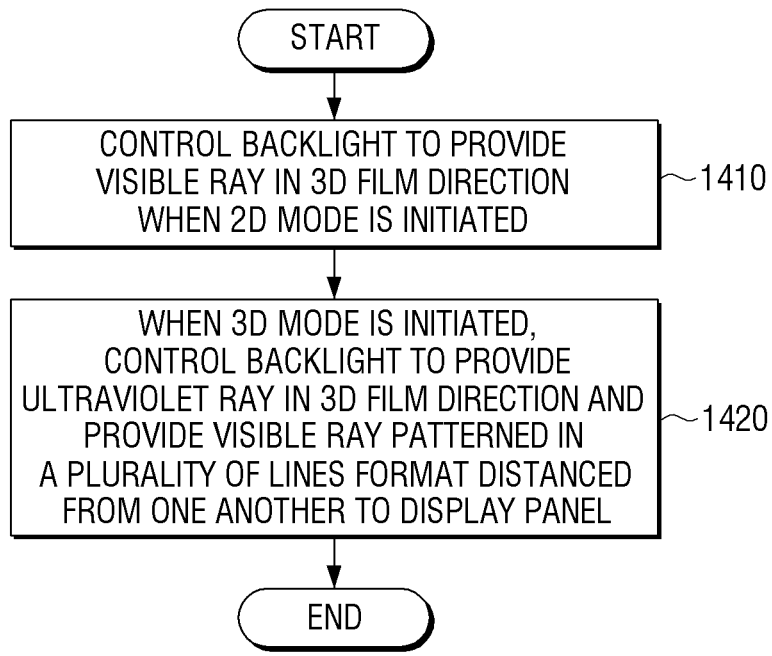
FIG. 14 is a flowchart for explaining a method of controlling a backlight, according to an exemplary embodiment.

Meanwhile, FIG. 14 is a flowchart for explaining a method of controlling a backlight, according to an exemplary embodiment.

According to the method illustrated in FIG. 14, in the backlight controlling method of the display apparatus that includes the 3D film disposed between the display panel, display panel and backlight, it is possible to control the backlight to provide a visible ray in the 3D film direction when the 2D mode is initiated (S1410).

In addition, it is possible to control the backlight to provide an ultraviolet ray in the 3D film direction when the 3D mode is initiated, so as to provide to the display panel (S1420) the visible ray patterned in the shape of a plurality of lines that are distanced from one another.

The 3D film may comprise a pattern formed from a plurality of lines distanced from one another by a predetermined distance, and a coating layer that is formed on one side of the plurality of lines pattern and that transmits or reflects the light patterned by the plurality of lines pattern.

In addition, the pattern formed by a plurality of lines is a UV reflected coating pattern that transmits visible ray and reflects ultraviolet ray, and the coating layer is a white phosphor coating layer that transmits visible ray when a visible ray enters the coating layer, and converts ultraviolet ray into visible ray and transmits the visible ray in response to ultraviolet that passed the space between the plurality of lines pattern entering the coating layer.

In another example, the pattern formed by a plurality of lines may be a white phosphor coating pattern that transmits a visible ray and converts an ultraviolet ray into a visible ray and transmits the visible ray in response to ultraviolet ray entering, and the coating layer is a UV reflected coating layer that transmits visible ray in response to visible ray entering and reflects the ultraviolet ray when the ultraviolet ray that passed the space between the lines of the plurality of lines pattern entering.

A non-transitory computer readable medium where a program that sequentially performs the controlling method according to the exemplary embodiments may be provided.

For example, a non-transitory computer readable medium may be provided where there is stored therein a program which performs a step of controlling the backlight to provide a visible ray in the 3D film direction when the 2D mode is initiated and a step of controlling the backlight to provide an ultraviolet ray in the 3D film direction so as to provide to the display panel the visible ray patterned in a plurality of lines pattern that are distanced from one another.

A non-transitory computer readable medium refers to a computer readable medium where data can be stored semi-permanently and not a medium that stores data for a short period of time such as a resister, cache, and memory etc. More specifically, the aforementioned various applications or programs may be stored in and provided by non-transitory computer readable medium such as CD, DVD, hard disk, Blueray Disc™, USB, memory card, and ROM, etc.

Although a few exemplary embodiments have been shown and described, it would be appreciated by those skilled in the art that changes may be made in this embodiment without departing from the principles and spirit of the invention, the scope of which is defined in the claims and their equivalents.

What is claimed is:

1. A display apparatus comprising:
  a display panel;
  a backlight configured to irradiate a visible ray to the display panel in a 2D mode, and irradiate an ultraviolet ray to the display panel in a 3D mode; and
  a 3D film disposed between the display panel and backlight,
  wherein the 3D film comprises:
  a pattern comprising a plurality of lines, the lines being distanced from one another by a predetermined distance,
  a coating layer, and
  a layer located between the pattern and the coating layer,
  wherein the layer located between the pattern and the coating layer includes a first surface facing a first direction and a second surface facing a second direction opposite to the first direction, and the plurality of lines are disposed on the first surface and the coating layer is disposed on the second surface,
  wherein the pattern is configured to transmit a visible ray irradiated from the backlight and entering the plurality of lines,
  wherein the pattern is configured to reflect an ultraviolet ray irradiated from the backlight to the plurality of lines,
  wherein the coating layer is configured to transmit the visible ray irradiated from the backlight and transmitted through the plurality of lines and then entering the coating layer and transmit a visible ray irradiated from the backlight and passing a space between the plurality of lines and then entering the coating layer, and
  wherein the coating layer is configured to convert an ultraviolet ray irradiated from the backlight and passing the space between the plurality of lines and then entering the coating layer into a visible ray and transmit the converted visible ray.

2. The display apparatus according to claim 1,
  wherein the pattern is a UV reflected coating pattern, and the coating layer is a white phosphor coating layer.

3. The display apparatus according to claim 1,
  wherein the backlight comprises at least one first light source configured to provide the visible ray to the display panel; and
  at least one second light source configured to provide the ultraviolet ray to the display panel.

4. The display apparatus according to claim 3, further comprising a backlight driver configured to selectively turn on the at least one first light source or the at least one second light source; and
  a controller configured to turn on the at least one first light source if the 2D mode is initiated, and turns on the at least one second light source if the 3D mode is initiated.

5. The display apparatus according to claim 1,
  wherein the layer located between the pattern and the coating layer is a transparent layer.

6. A 3D film comprising:
  a pattern comprising a plurality of lines, the lines of the pattern being distanced from one another by a predetermined distance; and
  a coating layer; and
  a layer located between the pattern and the coating layer,
  wherein the layer located between the pattern and the coating layer includes a first surface facing a first direction and a second surface facing a second direction opposite to the first direction, and the plurality of lines are disposed on the first surface and the coating layer is disposed on the second surface, wherein the pattern is configured to transmit a visible ray provided from a light source and entering the plurality of lines, wherein the pattern is configured to reflect an ultraviolet ray provided from the light source to the plurality of lines, wherein the coating layer is configured to transmit the visible ray provided from the light source and transmitted through the plurality of lines and then entering the coating layer and transmit a visible ray irradiated from the light source and passing a space between the plurality of lines, and wherein the coating layer is configured to convert an ultraviolet ray irradiated from the light source and passing the space between the plurality of lines and then entering the coating layer into a visible ray and transmit the converted visible ray.

7. The 3D film according to claim 6, wherein the pattern is a UV reflected coating pattern, and the coating layer is a white phosphor coating layer.

8. The 3D film according to claim 6, wherein the layer located between the pattern and the coating layer is a transparent layer.

9. A display apparatus comprising:
a 3D film disposed between a display panel and a backlight,
wherein the 3D film comprises:
a pattern comprising a plurality of lines, the lines being distanced from one another by a predetermined distance; and
a coating layer,
a layer located between the pattern and the coating layer,
wherein the layer located between the pattern and the coating layer includes a first surface facing a first direction and a second surface facing a second direction opposite to the first direction, and the plurality of lines are disposed on the first surface and the coating layer is disposed on the second surface, wherein the pattern is configured to transmit a visible ray irradiated from the backlight and entering the plurality of lines, wherein the pattern is configured to reflect an ultraviolet ray irradiated from the backlight to the plurality of lines, wherein the coating layer is configured to transmit the visible ray irradiated from the backlight and transmitted through the plurality of lines and then entering the coating layer and transmit a visible ray irradiated from the backlight and passing a space between the plurality of lines and then entering the coating layer, and wherein the coating layer is configured to convert an ultraviolet ray irradiated from the backlight and passing the space between the plurality of lines and then entering the coating layer into a visible ray and transmit the converted visible ray.

10. The display apparatus of claim 9, further comprising a display panel; and
a backlight configured to irradiate a visible ray to the display panel in a 2D mode, and irradiate an ultraviolet ray to the display panel in a 3D mode.

11. The display panel of claim 10, wherein the pattern is a UV reflected coating pattern and
the coating layer is a white phosphor coating layer.

12. The display apparatus according to claim 9, wherein the layer located between the pattern and the coating layer is a transparent layer.

13. The display apparatus according to claim 10, wherein the backlight comprises at least one first light source configured to provide the visible ray; and at least one second light source configured to provide the ultraviolet ray.

* * * * *